United States Patent [19]

Takase et al.

[11] Patent Number: 4,934,218
[45] Date of Patent: Jun. 19, 1990

[54] HYDRAULIC CONTROL DEVICE FOR AN AUTOMATIC TRANSMISSION

[75] Inventors: Isao Takase, Aichi; Takenori Kano, Anjo; Haruki Takemoto, Chiryu; Fumitomo Yokoyama, Anjo; Mamoru Niimi, Handa, all of Japan

[73] Assignee: Aisin Aw Co., Ltd., Anjo, Japan

[21] Appl. No.: 293,396

[22] Filed: Jan. 4, 1989

[30] Foreign Application Priority Data

Jul. 19, 1988 [JP] Japan ................... 63-180538

[51] Int. Cl.$^5$ ................... F16D 25/11; F16D 43/04
[52] U.S. Cl. ................... 74/868; 74/867; 192/106 F
[58] Field of Search ................... 74/865, 868, 867; 192/106 F, 85 AA, 85 F, 87.12, 87.13, 103 A, 103 FA

[56] References Cited

U.S. PATENT DOCUMENTS 3,647,037  3/1972  Toma ................... 192/106 F
3,974,743  8/1976  Ivey ................... 192/106 F X Primary Examiner—Leslie A. Braun
Assistant Examiner—Khoi Q. Ta
Attorney, Agent, or Firm—Kanesaka and Takeuchi

[57] ABSTRACT

A hydraulic control device which has a check valve controlling hydraulic pressure to a hydraulic actuator. Hydraulic pressure is selectively supplied to one of plural oil passages having different capacity orifices by a switching valve which switches high speed rotation mode and low speed rotation mode. A hydraulic power source and plural oil passages having different capacity orifices are connected to the switching valve which is controlled by hydraulic pressure varying according to vehicle speed. When rotation of the input shaft is low, the switching valve is connected to the oil passage having small capacity orifice, then hydraulic pressure is supplied to the hydraulic actuator through the orifice of small capacity. At this stage, as centrifugal force working on the ball in the check valve is low, the check valve is closed by even small amount of oil supply through the small capacity orifice, and raises hydraulic pressure in the actuator, so the clutch is engaged smoothly. When rotation of the input shaft is high, the switching valve is connected to the oil passage having the large capacity orifice, then hydraulic pressure is supplied to the hydraulic actuator through the large capacity orifice. At this stage, even if centrifugal force works on the ball is large, the check valve is closed by large amount of oil supply through the large capacity orifice, and raises hydraulic pressure in the hydraulic actuator, so the clutch is engaged smoothly.

2 Claims, 5 Drawing Sheets

FIG. 3

|     | C0 | C1 | C2 | C0a | B1 | B2 | B3 | F0 | F1 | F2 |
|-----|----|----|----|-----|----|----|----|----|----|----|
| 1ST |    | ○  |    |     |    |    | △  |    |    | ○  |
| 2ND |    | ○  |    |     | △  | ○  |    |    | ○  |    |
| 3RD | ○  | ○  |    | ○   |    | ○  |    | ○  |    |    |
| 4TH | ○  |    |    | ○   | ○  | ○  |    |    |    |    |
| REV |    |    | ○  |     |    |    | ○  |    |    |    |

HYDRAULIC CONTROL DEVICE FOR AN AUTOMATIC TRANSMISSION

BACKGROUND OF THE INVENTION

1. Field of the Invention

This invention relates to a hydraulic control device, in particular, to a hydraulic control device for an automatic transmission having a check valve which drains centrifugal hydraulic pressure developed in a chamber of a hydraulic actuator. In detail it relates to a device to control supply of hydraulic pressure to a hydraulic actuator.

2. Description of the Prior Art

Generally, a hydraulic actuator for an automatic transmission engages and releases frictional engaging elements such as clutches, by supply and drain of hydraulic pressure In the case of a device having a hydraulic actuator installed on a rotating element, centrifugal hydraulic pressure works on oil in a hydraulic chamber of the hydraulic actuator, which makes it difficult to release clutches because oil remains in the hydraulic chamber, even the valve is switched to drain oil in the chamber.

For the purpose of draining the remained oil, a check valve having a ball in a circular cone hole is placed in a piston. The hydraulic pressure works on the ball to close the hole when the pressure works on the hydraulic chamber, and the ball detaches from the hole by centrifugal force to drain hydraulic pressure when draining.

However, in case that the capacity of an orifice made at an oil passage which is connected to the hydraulic chamber of the hydraulic actuator is small, it takes quite a time to raise hydraulic pressure, which run through the orifice, so the slip time is made longer, and, as a result, the clutch may burn. Also, when rotation increases, hydraulic pressure raise can not overcome centrifugal force working on the ball, so that initial supply of hydraulic pressure is disabled and the clutch may be under non-engaging condition. On the other hand, in case that capacity of the orifice is large, shift shock may happen because of sharp increase of hydraulic pressure especially when rotation speed is low.

For the purpose of preventing centrifugal hydraulic pressure generated in the hydraulic chamber of the clutch actuator during rotating at a high speed, the following structure has been proposed: as shown in FIG. 5, baffle plates 41,41 are installed near the check valve 25 made in a piston 40. By these baffle plates 41,41, occurrence of swirl is prevented, so that increase of hydraulic pressure in the hydraulic chamber, which works on the ball, is practiced securely and closing of the check valve 25 is done rapidly.

As shown in FIG. 6, also another structure has been proposed: a plate 44 is fixed on the rigid member 43 without movement, the plate 44 is covered by a back side of the piston 45 oil-tightly, and spring 49 is installed between the plate 44 and the piston 45, so that a ballancing chamber 48, opposing a hydraulic chamber 47 formed by the piston 45 and the clutch 46, is formed. By this structure the hydraulic pressure is supplied to the balancing chamber 48 from an oil path connected to the actuator 47. So this pressure which becomes centrifugal hydraulic pressure in the chamber 48 counterbalances the centrifugal hydraulic pressure working on the hydraulic pressure chamber 47.

However, the baffle plate is not enough to get rid of the centrifugal hydraulic pressure even if occurrence of swirls is prevented and the closing of the check valve is done rapidly. Especially when the hydraulic actuator rotates at high speed, slip time of the frictional clutch becomes longer, which may result in burning of the frictional discs.

In case that the ballancing chamber is employed, the check valve can be eliminated, however, the structure becomes complicated, so that problems of maintenance may happen, axial length may increase, and mounting space may not correspond to the recent trend of front-engine-front-drive cars which requires much narrower space for mounting.

SUMMARY OF THE INVENTION.

The present invention is purposed to provide a hydraulic control device for an automatic transmission by applying hydraulic pressure selectively through a plurality of oil passages having different capacity of orifices so that hydraulic pressure rise is conducted properly and securely at both high speed rotation and low speed rotation of a hydraulic actuator.

The object is achieved by the following structure: for example, as shown in FIG. 1, an automatic transmission includes a hydraulic actuator (12) installed on a rotating member (9); by the hydraulic actuator (12), certain clutch (for example, forward clutch C1) is engaged at a required moment so that the rotating member (9) is connected to another rotating member (for example, a ring gear R1 of a single planetary gear); and the actuator (12) has a check valve (25) to drain centrifugal hydraulic pressure developed in a hydraulic chamber (26); an oil passage (27 connected to the hydraulic chamber (26) of the actuator (12) has two oil passages (29), (30) placed in parallel and having two orifices (29a), (30a) with different capacity. Furthermore a switching valve (31) for connecting the hydraulic power source ($P_1$) to one of the oil passages (29), (30) is situated. The switching valve (31) leads the hydraulic pressure source ($P_1$) to the oil passage (30) where the orifice (30a) with a large capacity is situated when the rotation speed is high, and on the other hand leads the hydraulic pressure source ($P_1$) to the oil passage (29) where the orifice (29a) with a small capacity is situated when the rotation speed is low.

It is more suitable that the rotating member (9) is an input shaft, the above clutch (C1) is a forward clutch which engages at the time of forward running, and that the switching valve (31) is set to be controlled by hydraulic pressure varying according to vehicle speed.

Based on the above structure, when the hydraulic chamber (26) of the hydraulic actuator (12) is drained, the check valve (25) drains centrifugal hydraulic pressure because the centrifugal force working on the ball (25a) overcomes a hydraulic pressure of the hydraulic chamber (26), so that the ball (25a) detaches from the seat (25b) made on the drain oil passage of the circular cone shape. When applying hydraulic pressure to the hydraulic actuator (12) from the oil passage (27), centrifugal force working on the ball (25a) of the check valve (25) is small when number of rotations of the rotating member (9) is small, so that the ball (25a) sits on the seat (25b) by slight rise of hydraulic pressure in the hydraulic chamber (26). At this state, the switching valve (31) connects the hydraulic pressure source ($P_1$) and the oil passage (29), and hydraulic pressure is applied to the hydraulic chamber (26) through the orifice (29a) with small capacity. As a result, the check valve (25) is closed by only a little amount of hydraulic pressure through this small capacity orifice (29a) to make hydraulic pressure of the hydraulic chamber (26) increase and engage certain clutch (C1) smoothly.

On the other hand, the centrifugal force working on the ball (25a) of the check valve (25) is large when number of rotations of the rotating member (9) is high, so that the ball (25a) does not sit on the seat (25b) if hydraulic pressure of the hydraulic chamber (26) is not increased sharply. At this stage, the switching valve (31) connects the hydraulic pressure source ($P_1$) and the oil passage (30), and hydraulic pressure is applied to the hydraulic chamber (26) through the large capacity orifice (30a). As a result, the check valve (25) is closed by the large amount of hydraulic pressure through the large capacity orifice (30a), to thereby increase hydraulic pressure of the hydraulic chamber (26), and engage certain clutch (C1) smoothly.

The numbers and letter which are shown in the parentheses are to refer to the drawings(s), and do not define the invention, which is referred in detailed description of the preferred embodiment.

BRIEF DESCRIPTION OF THE DRAWINGS

In the drawings:

FIG. 3 is a table of operation of the automatic transmission.

DETAILED DESCRIPTION OF THE PREFERRED EMBODIMENTS

An example of the present invention shall now be described in detail.

Figure 2:
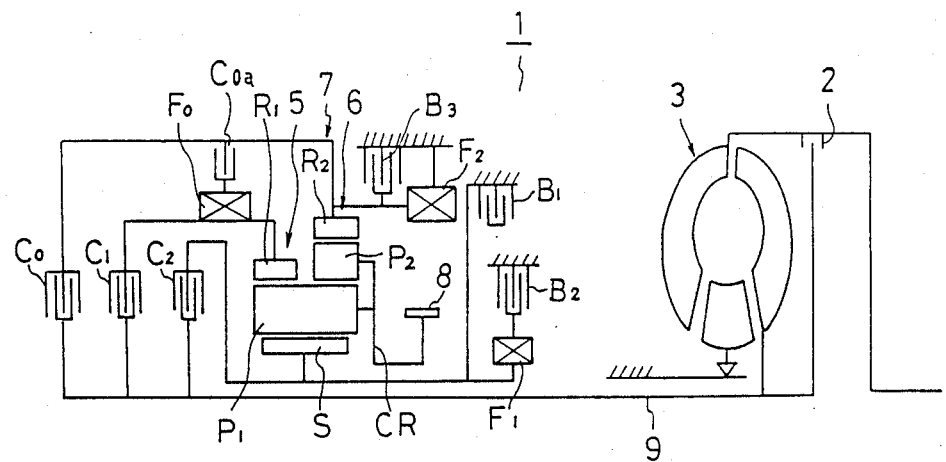
FIG. 2 is a schematic illustration of the automatic transmission to which the present invention is applied.

A four speed automatic transmission 1 has, as shown in FIG. 2, a torque converter 3 having a lock-up clutch 2, and a planetary gear unit 7 having a single planetary gear 5 and a dual planetary gear 6. And both sun gears S and both carriers CR in the planetary gear 5 and 6 are composed as one unit, respectively. The carrier CR is connected to an output gear 8 (counter drive gear). A ring gear R1 of the single planetary gear 5 and the input shaft 9 are connected through a first clutch (forward clutch) C1. The sun gear S and the input shaft 9 are connected through a second clutch (reverse clutch) C2. The sun gear S is situated to be restrained by a first brake B1 which restrains the sun gear directly and by a second brake B2 which restrains the sun gear through a first one-way clutch F1. Furthermore, a ring gear R2 of the dual planetary gear 6 and the input shaft 9 are connected through a third clutch (a forward clutch) C0. This ring gear R2 is restrained by a third brake B3 and a second one-way clutch F2. The ring gear R2 of the dual planetary gear 6 and the ring gear R1 of the single planetary gear 5 are connected through a fourth clutch C0a and the third one-way clutch F0.

Figure 4:
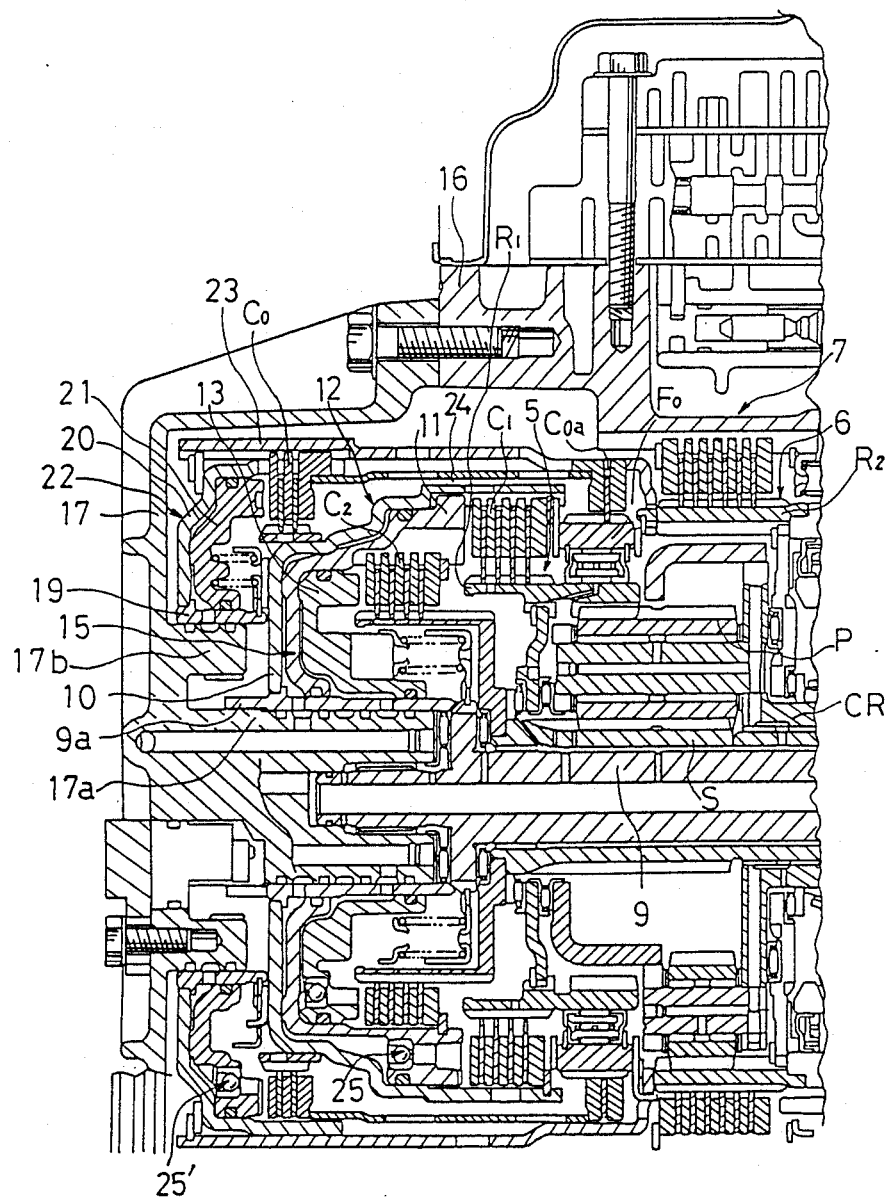
FIG. 4 is a cross sectional view of the automatic transmission to which the present invention is applied.
Figure 5:
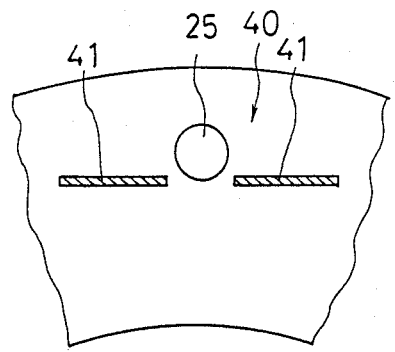
FIG. 5 is a front elevation of a part of a piston, which is shown as a basic example to solve conventional problems.
Figure 6:
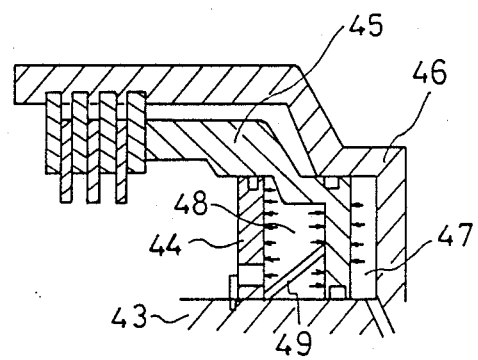
FIG. 6 is a cross sectional view of the hydraulic actuator, which is shown as a basic example to solve conventional problems.

As shown in FIG. 4, a sleeve 9a on which a ring shaped clutch drum 10 is fixed is fixed at the end side of the input shaft 9. A first movable member 11 is situated oil-tightly on the inside of the clutch drum 10. The drum 10 and the movable member 11 compose a hydraulic actuator 12 used for the first clutch (forward clutch) C1, which shall be explained later. On the inside of the first movable member 11, a second movable member 13 is situated oil-tightly. The first and second movable members 11 and 13 compose a hydraulic actuator 15 used for the second clutch (reverse clutch) C2, which shall be explained later. On the end of a transaxle case 16, a rear cover (case) 17 is fixed by bolts and the like. This rear cover 17 has an inner projection 17b, on which a sleeve 19 is fixed. A cylinder member 20 is fixed on the sleeve 19, and a piston member 21 is situated in the inner side of the cylinder member 20 oil-tightly. This cylinder member 20 and the piston member 21 compose a hydraulic actuator 22 for the third clutch (over drive clutch) C0 and the fourth clutch (F0 clutch) C0a, which shall be explained later.

The first clutch C1 is placed between a clutch drum 10 and the ring gear R1 of the single planetary gear 5. And the second clutch C2 is placed between the clutch drum 10 and the sun gear S. Furthermore the third clutch C0 is situated between the clutch drum 10 and the member 23 extending from the ring gear R2 of the dual planetary gear 6. A fourth clutch C0a is situated between the drum member 23 and the ring gear R2 of the single planetary gear 5 through the one way clutch F0. A connecting member 24 is situated between the third clutch C0 and the fourth clutch C0a. By this structure the third and fourth clutches C0, C0a work at the same time by the one hydraulic actuator 22.

Figure 1:
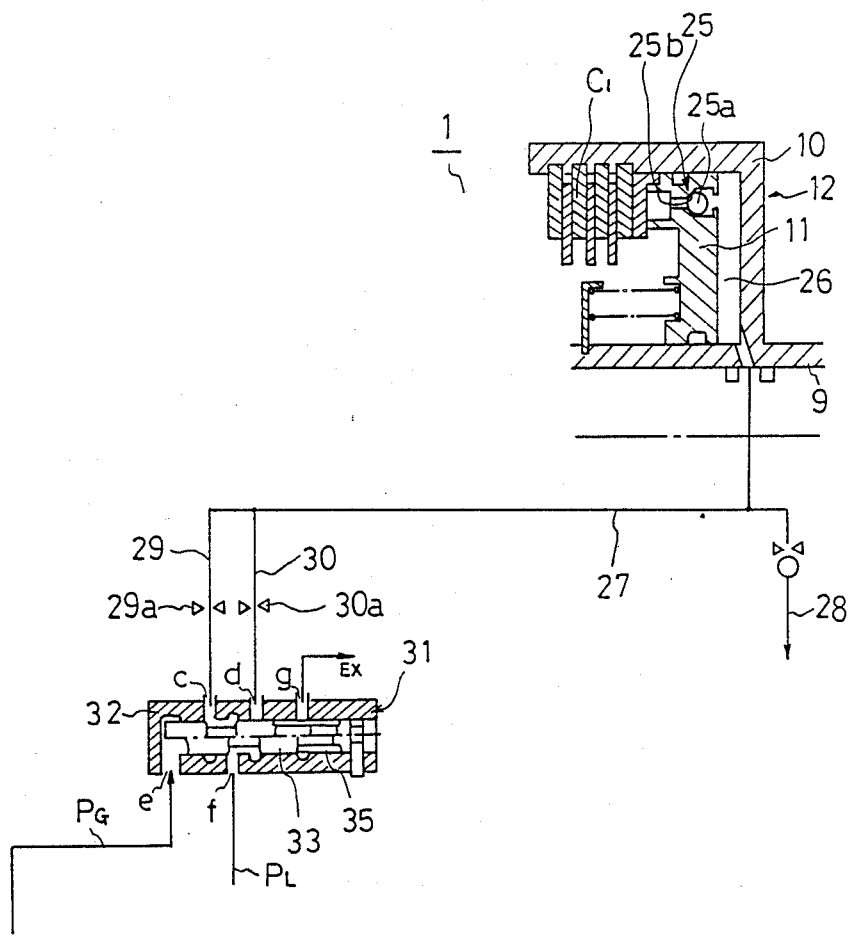
FIG. 1 is a cross sectional view of a main part of the hydraulic control device for an automatic transmission, which is related to the present invention.

And on the hydraulic actuator 12 for the first clutch (forward clutch) C1, a check valve 25 is situated on a peripheral area of piston member 11, as shown in FIGS. 1 and 4. The check valve 25 is composed of a ball 25a and a seat 25b which has a circular cone oil passage. The check ball 25a can drain centrifugal hydraulic pressure which works on a hydraulic chamber 26 composed of a piston member 11 and a clutch drum 10. An oil passage 27 constituted on a hub 17b of the rear cover 17 is connected to the hydraulic chamber 26 through a hole in the sleeve 9a. And the oil passage 27 is connected to two oil passages 29 and 30 having different orifices 29a and 30a, both of which have different oil flow capacity, and also connected to a drain oil passage 28. And the oil passages 29 and 30 are connected to a switching valve 31. The switching valve 31 has a valve sleeve 32, a spool 33, a spring 35. In the valve sleeve 32, ports "c", "d" to which oil passages 29, 30 are connected are situated, a port "f" to which line pressure $P_L$ as a source of the hydraulic pressure is applied is situated, and a port "e" to which governor pressure $P_G$ varying in accordance with vehicle speed and a drain port "g" are situated. A hydraulic pressure from the port "e" works on the end of the spool 33 whose end has a spring 35. The line pressure port "f" is switched to the port "c" or "d" by the governor pressure $P_G$ working on the port "e".

Incidentally, a check valve 25' like the check valve 25 is situated on the piston members of other hydraulic actuators.

And the explanation of the above embodiment shall be shown in detail. The four speed automatic transmission 1 works exactly as what is shown in the operation table of FIG. 3. That is to say, at the first speed (1st) at D range, the first clutch C1 is connected. Then the rotation of the input shaft 9 is transmitted to the ring gear R1 of the single planetary gear 5 through the clutch C1. And at this state, the rotation of the ring gear R2 of the dual gear 6 is restrained by the second one-way clutch F2, so that the sun gear S rotates reversely without load, and the carrier CR is decelerated in forward direction greatly. This rotation is taken out from the output gear 7. And at this time, the spool 33 of the switching valve 31 is switched by, for example, governor pressure $P_G$.

In other words, when the vehicle is at a low speed, the governor pressure to work on the port "e" is low, so the switching valve 31 is switched and the port "f" and a port "c" are connected. By this, line pressure $P_1$ runs through an oil passage 29 where the orifice 29a is situated. This orifice 29a allows only a small amount of oil to flow. The hydraulic pressure, by the oil passages 27, 29 through the orifice 29a, is applied to the hydraulic chamber 26 which is under rotation. At this moment, the check valve 25 situated at the first movable member 11 rotating with the clutch drum 10 rotates with the input shaft 9. Therefore, the centrifugal force works on the ball 25a. As the rotation speed of the input shaft 9 is low, this centrifugal force is weak. The ball 25a sits on the seat 25b by even a small oil application through the orifice 29a, and the application of oil overcomes the centrifugal force working in the hydraulic chamber 26. So the check valve 25 is closed and increases hydraulic pressure of the hydraulic chamber 26 smoothly, and the clutch C1 is smoothly engaged.

When the vehicle is at high speed, the switching valve 31 is switched and the port "f" and the port "d" are connected. By this process, the line pressure $P_1$ is connected to the oil passage 30 having the orifice 31a which allows large amount of oil to flow. The large amount of the hydraulic pressure, by the oil passages 30, 27, is applied to the hydraulic chamber 26 which is under rotation. And based on the large amount of hydraulic pressure application, the hydraulic pressure in the hydraulic chamber 26 increases sharply. This large hydraulic pressure works on the ball 25a on which comparatively large centrifugal force works based on the high speed rotation of the input shaft 9, so that the large pressure application overcomes the centrifugal force based on the rotation of the input shaft 9, and the ball 25a sits on the seat 25b. By this, the check valve 25 is closed, and the hydraulic pressure in the hydraulic chamber 26 increases, so that the clutch C1 engages smoothly.

Furthermore, at the 2nd speed mode (2ND), the first clutch C1 is connected and the second brake B2 operates. And the rotation of the sun gear S is restrained by the first one-way clutch F1 based on the second brake B2, consequently the rotation of the ring gear R1 from the input member 9 rotates the ring gear R2 of the dual planetary gear 6 in normal direction without load, and decelerates rotation of the carrier CR in normal rotating direction, and the rotation of the carrier CR is taken from the output member 7 as the second speed. And at the third speed (3RD), not only the first clutch C1 is connected but also the third clutch C0 and the fourth clutch C0a are connected. Then, the rotation of the input shaft 9 is transmitted to the ring gear R1 of the single planetary gear 5 through the first clutch C1. And it is also transmitted to the ring gear R2 of the dual planetary gear 6 through the third clutch C0. Accordingly all the elements in the both planetary gears 5 and 6 rotate together, so that the rotation which is the same speed as the input member 9 is transmitted from the carrier CR to the output member 7. At this moment, the second brake B2 is kept under restrained condition until the third clutch C0 engages. This motion prevents the vehicle from returning to the first speed mode from the second speed mode. When the planetary gears 5 and 6 rotate together, based on the engagement of the fourth clutch C0a, the third one-way clutch F0 rotates and synchronizes.

And at the fourth speed mode (4TH), the first clutch C1 is released and at the same time the first brake B1 operates. Then the rotation of the input shaft 9 is transmitted to the ring gear R2 of the dual planetary gear 6 through the third clutch C0. As the sun gear S is restrained at this stage, the carrier CR rotates at high speed with rotating the ring gear R1 of the single planetary gear 5 without load. This high speed rotation is taken out from the output member 7 as an over drive (O/D). According to the release of the clutch C1, the hydraulic pressure of the hydraulic chamber 26 in the hydraulic actuator 12 is drained. Then the centrifugal force working on the ball 25a overcomes the hydraulic pressure of the hydraulic chamber 26, and the ball 25a detaches from the seat 25b, so that the centrifugal hydraulic pressure in the hydraulic pressure chamber 26 is drained.

Furthermore, at the reverse range (REV), the second clutch C2 and the third (1st & reverse) brake B3 operate. The rotation of the input shaft 9 is transmitted to the sun gear S through the second clutch C2. At this state, as the ring gear R2 is restrained by the operation of the third brake B3, the ring gear R1 of the single planetary gear 5 and the carrier CR rotate reversely, and as a result, the reverse rotation is taken out from the output member 7. And in FIG. 3, Δ means that each element operates at coasting condition (reversal of input and output). Namely, at D range, when coasting, the automatic transmission is under the condition of without load because of the one-way clutches F1, F2, while at 1 range, when coasting, the ring gear R2 is under restrained condition due to the third brake B3, so the first speed state is kept, and engine brake operates. Further, at 2 range, when coasting, the sun gear S is under restrained condition by the first brake B1, so the second speed state is kept, and engine brake operates.

TECHNICAL ADVANTAGES OF THE INVENTION

As explained in detail, the hydraulic pressure is applied to the hydraulic chamber (26) of the hydraulic actuator (12) by the switching valve (31). When rotation of the rotating member (9) is high, the valve (31) makes hydraulic pressure run through the oil passage (30) having the orifice (30a) with large capacity, and on the other hand, when rotation of the rotating member (9) is low, the valve (31) makes hydraulic pressure run through the oil passage (29) having the orifice (29a) with small capacity. Due to the above motions, the adequate amount of hydraulic pressure is applied to the hydraulic chamber (26) corresponding to number of rotations of the rotating member (9). So, when the rotating member (9) rotates at high speed, the check valve (25) is securely closed, while the sharp increase of hydraulic pressure in the hydraulic chamber (26) is prevented when the rotating member (9) is at low speed. Consequently, optimum piston stroke time is obtained, so that the burning of clutch frictional member caused by the excessively long stroke time, and the shift shock caused by the excessively short stroke time when the clutch is engaged are securely prevented.

In the case that rotating member (9) is an input shaft, the clutch (C1) is a forward clutch to engage at forward running and the switching valve (31) is provided so as to be controlled by the hydraulic pressure varied by vehicle speed, the clutch is engaged smoothly at the time of starting where shift shock is usually big, and shift feeling and driving feeling are greatly improved.

What is claimed is:

1. A hydraulic control device for an automatic transmission, comprising, a hydraulic power source, first and second rotating members, a clutch situated between the first and second rotating members, a hydraulic actuator situated on the first rotating member and engaging the clutch to connect the first and second rotating members as required, said hydraulic actuator having a hydraulic chamber and a centrifugal hydraulic pressure draining valve to drain centrifugal hydraulic pressure generated in the hydraulic chamber, a plurality of oil passages arranged in parallel and connected to the hydraulic chamber, said oil passages having first and second orifices, said first orifice having a large diameter than the second orifice, and a switching valve situated between the hydraulic power source and the oil passages to connect the hydraulic power source to one of the oil passages so that when number of rotations of the first rotating member is higher than a predetermined value, the hydraulic power source is connected to the oil passage having the first orifice, and when number of rotations of the first rotating member is lower than a predetermined value, the hydraulic power source is connected to the oil passage having the second orifice.

2. A hydraulic control device for an automatic transmission of claim 1, wherein said first rotating member is an input shaft, said clutch is a forward clutch which is engaged at forward running, and said switching valve is controlled by hydraulic pressure varying according to vehicle speed.

* * * * *